United States Patent [19]

Cheal et al.

[11] 4,358,764
[45] Nov. 9, 1982

[54] COUPLING UNIT FOR COAXIAL CABLE INCLUDING MEANS FOR RADIATING WAVE ENERGY

[75] Inventors: James Cheal, Tempe; Vincent J. McHenry, Scottsdale, both of Ariz.

[73] Assignee: Southwest Microwave, Inc., Tempe, Ariz.

[21] Appl. No.: 173,009

[22] Filed: Jul. 28, 1980

[51] Int. Cl.³ .................... G01S 13/56; G08B 13/24
[52] U.S. Cl. .................... 343/5 PD; 333/127; 333/237; 333/260; 340/554; 343/853; 343/860
[58] Field of Search .......... 333/237, 27, 260, 115, 333/127, 136; 343/853, 856, 5 PD; 340/552, 553, 554

[56] References Cited

U.S. PATENT DOCUMENTS

| | | | |
|---|---|---|---|
| 2,147,746 | 2/1939 | Luck et al. | 315/378 |
| 2,234,234 | 3/1941 | Cork et al. | 343/791 |
| 2,412,393 | 12/1946 | Ghosh | 333/115 X |
| 2,490,238 | 12/1949 | Simons | 177/352 |
| 3,100,879 | 8/1963 | Greunke | 331/135 |
| 3,237,105 | 2/1966 | Kalmus | 325/29 |
| 3,237,191 | 2/1966 | Bojko | 343/5 |
| 3,292,117 | 12/1966 | Bryant et al. | 333/260 |
| 3,492,605 | 1/1970 | Ziegler, Jr. | 333/260 X |
| 3,599,213 | 8/1971 | Fessenden | 343/710 |
| 3,728,721 | 4/1973 | Lee et al. | 343/5 PD |
| 3,744,044 | 7/1973 | Vosteen | 340/213 |
| 3,754,254 | 8/1973 | Jinman | 343/7.7 |
| 3,760,400 | 9/1973 | Galvin et al. | 340/258 |
| 3,803,539 | 4/1974 | McMaster | 340/1 R |
| 3,845,461 | 10/1974 | Foreman | 340/1 R |
| 3,886,549 | 5/1975 | Cheal et al. | 343/7.7 |
| 3,922,660 | 11/1975 | Galvin | 340/258 |
| 3,956,743 | 5/1976 | Geiszler et al. | 340/258 C |
| 4,012,730 | 3/1977 | Nicrolls | 340/258 |
| 4,064,499 | 12/1977 | Geiszler et al. | 340/258 C |
| 4,087,814 | 5/1978 | Spirig | 343/5 PD |
| 4,091,367 | 5/1978 | Harman | 340/552 |

OTHER PUBLICATIONS

"Guidar", Computing Devices Company, Control Data.

Primary Examiner—Paul L. Gensler
Attorney, Agent, or Firm—Joseph H. Roediger; Victor Myer; Charles E. Cates

[57] ABSTRACT

An optimum coupling unit for joining adjacent sections of coaxial cable and a coupled radiating antenna includes different diameters of the dielectric material, different diameters of central conductor and different values of the dielectric constant material in order to provide impedance matching at any section of the coupler including the coupled antenna to the impedance of the coaxial cable. The coupling unit is combined with the antenna as an integral unit. The antenna may be a dipole whose elements are coupled to the coupling unit through a parallel plate transmission line. Impedance matches are maintained at each coupling point.

10 Claims, 10 Drawing Figures

COUPLING UNIT FOR COAXIAL CABLE INCLUDING MEANS FOR RADIATING WAVE ENERGY

RELATED APPLICATION

This invention is related to an application entitled Intrusion Detector System, Ser. No. 6,172,944, filed July 28, 1980, in the name of James Cheal and assigned to the same assignee as the subject invention.

BACKGROUND OF THE INVENTION

This invention relates to coupling units for adjacent sections of transmission lines from which radiation, or wave energy, is coupled, more particularly to such couplers for adjacent sections of coaxial cable and it is an object of the invention to provide an improved coupling unit of this nature.

Intrusion detection systems intended for use as perimeter surveillance systems associated with walls or fences that surround the area to be protected have included single lengths of conductors or cables. Such systems are described in the application Ser. No. 6/172,944, referred to above. A coupling unit for adjacent sections of transmission line, or coaxial cable, particularly for installations wherein a relatively large number of sections of coaxial cable and concomitant large numbers of coupling units was not an element of the prior systems.

The benefits of low cost, simplicity in assembling and efficiency in operation are achieved in the transmitter, coaxial cable sections, receiver, discrete radiating antennas and coupling unit system as described in the indicated application Ser. No. 6/172,944. The coupling unit for use in such a system must, likewise, be of low cost, simple to assemble and efficient in operation.

At the frequencies used in relevant intrusion systems attenuation is an important factor and must be reduced. Regular television coaxial cable having 75 ohm characteristic impedance is a good solution for this and has the advantage of low cost. The coupling units for sections of such cable must have low attenuation or, insertion loss, and enable impedance matching to take place, not only between adjacent sections of coaxial cable but from the coaxial cable to the radiating antennas.

In the latter aspect, the coupling unit requires an opening through which the wave energy is coupled from the center conductor of the coaxial cable. The increase in series impedance of the cable because of this opening must be compensated for to avoid impedance mismatching. In the coupling unit the coupling coefficient, or degree of coupling, to the radiating antenna, as by an intervening transmission line can be selected to give optimum transmission of the transmitted signal as well as to the reflected signal resulting from the movement of an intruder into the protected perimeter.

The coupling unit desirably should lend itself to ready assembly at the factory to an antenna unit for elimination of field assembly problems. Similarly, it should enable the field connectability of adjacent coaxial cable sections with a minimum of effort and without any introduction of further losses.

It is a further object of the invention to provide an improved coupling unit having the advantages and requirements as indicated above and as described in the following summary of the invention.

SUMMARY OF THE INVENTION

In carrying out the invention according to one form there is provided a coupling unit for joining two sections of coaxial cable and including means for radiating wave energy, the coaxial cable haviing a predetermined characteristic impedance and comprising an innerconductor, a surrounding layer of dielectric material and a conducting sheath surrounding the layer of dielectric material, the coupling unit comprising a central conductor having two end sections and a center section therebetween, each of the end sections being adapted to be connected to the center conductor of a coaxial cable, a cylindrical dielectric member surrounding the end sections and the center section of the central conductor, a metallic sleeve member surrounding the cylindrical dielectric member, the diameter of the two end sections and the diameter of the cylindrical dielectric member providing the same characteristic impedance as that of said coaxial cable, and an opening in the metallic sleeve member adjacent the center section of the central conductor for enabling wave energy radiation from said coaxial cable, the center section of the central conductor having an enlarged diameter for compensating for impedance mismatching due to the opening.

Further, the coupling unit comprises a connecting member metallically joined to the sleeve member and having an air-filled central bore through which extends one of the end sections, the diameter of the air-filled bore and the diameter of the end section of the central conductor therethrough providing an impedance matched to the characteristic impedance of the coaxial cable.

Still further, the center section of the central conductor has an enlarged diameter for compensating for impedance mismatching due to the opening and the portion of the cylindrical dielectric member adjacent the opening has a reduced diameter for effecting a desired coupling coefficient between a radiating member and the central conductor.

It is a further object of the invention to provide an improved combination of a coupling unit and radiating element assembled together.

DESCRIPTION OF THE PREFERRED EMBODIMENTS

Figure 1:
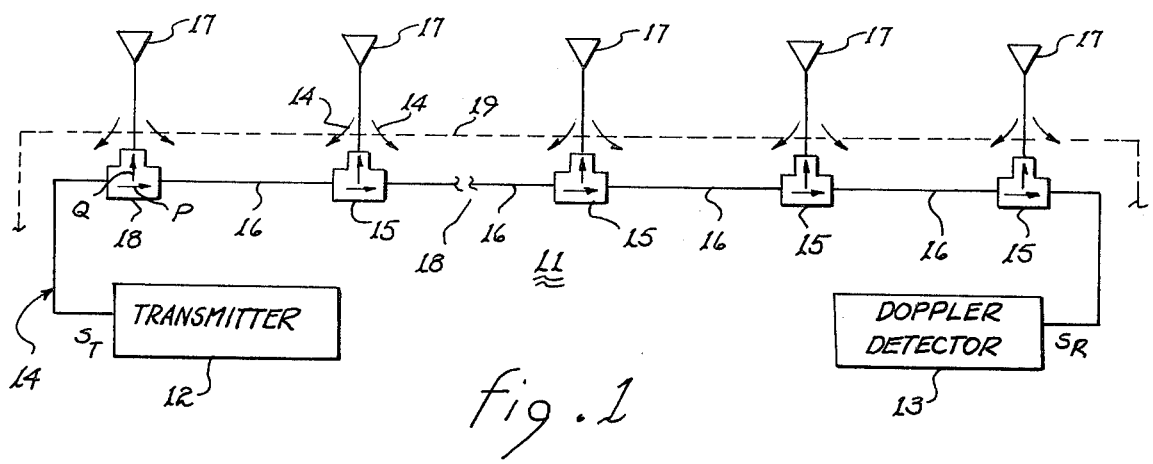
FIG. 1 is a diagrammatic view of an intrusion detection or perimeter surveillance system, including a coupling unit according to the invention.

Referring to the drawings there is shown in FIG. 1 an intrusion detection system 11 including a coupling unit according to the invention, comprising a wave transmitter 12, a doppler detector or receiver 13 interconnected by a transmission line 14, a series of coupling units or couplers 15 interconnecting uniform length sections 16 of the transmission line, and a series of radiating antennas 17 each one of which fed from the transmission through a respective one of the couplers 15. The transmission line 14 is shown broken at point 18 to indicate that the transmission line may be of varying length. Typically, the transmission line between transmitter 12 and receiver 13 may be about 100 meters in length and include 33 couplers and antennas uniformly spaced whereby each antenna would be disposed on the mounting pole of ordinary chain link fence. The transmitter 12 and the receiver 13 may be of any well known type made for operating at the frequencies desired.

The dotted line 19 diagrammatically shows the fence, or perimeter, to be protected.

Figure 2:
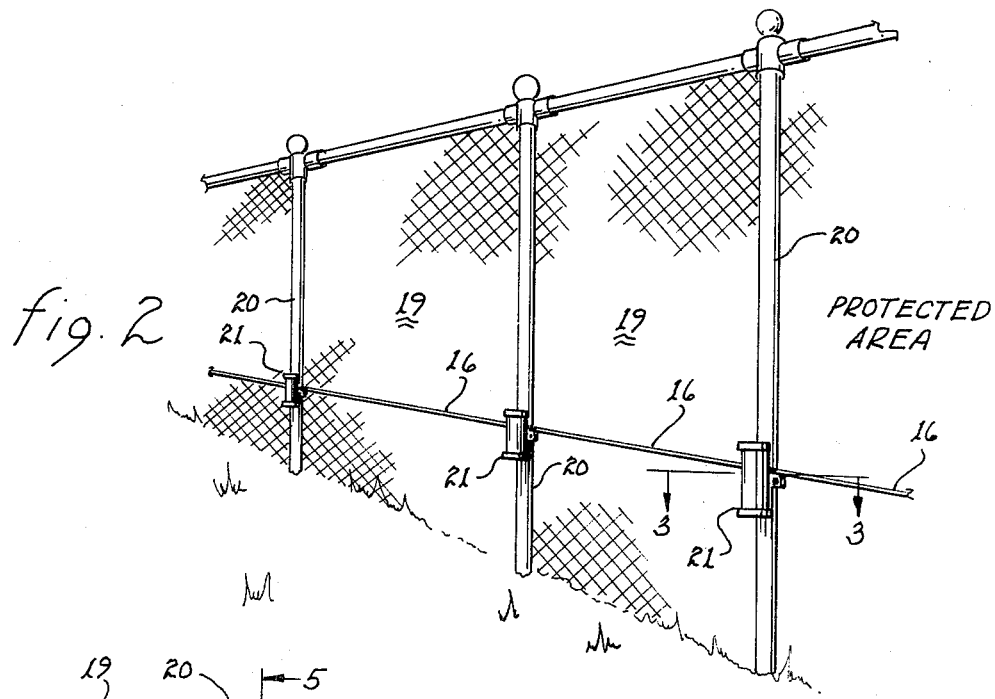
FIG. 2 is a perspective view showing installation of a system on an ordinary chain link fence.

FIG. 1 may profitably be considered in connection with FIG. 2 in which a typical chain link fence 19 is shown supported by steel posts 20 on each one of which is disposed an antenna assembly 21 to be more particularly described. Between each of the antenna assemblies 21 in FIG. 2 there may be seen a length, or section, 16 of coaxial cable.

The antenna assemblies 21, typically, may be mounted below the middle of a steel pole 20 which is just to say about 2½ feet from the ground on a pole six feet high.

As will become clear from subsequent description, the antenna assemblies 21 may include a dipole antenna which radiates an essentially spherical pattern extending outwardly from the particular post or antenna. The signal level is selected such that the radiation patterns of the antennas overlap each other and reach the ground as well as an area adjacent the top of the chain link fence, thereby providing a substantial perimeter of protection around the designated area.

The coaxial cable 16 may be of the variety used in cable television having a characteristic impedance of seventy-five ohms. Such cable comprises a center conductor 22, a surrounding dielectric layer 23, a surrounding metallic foil sheath 24, a braided metallic jacket 25 and an insulating cable jacket 26. One end of the cable section 16 is attached to an extension of the coupler 15 as will be subsequently described and is permanently held thereto by a crimping ferrule 27 as may be seen in FIG. 6.

To assemble the coaxial cable into the system, a coupling unit 15 (FIG. 6) is attached to the base of an antenna assembly 21, and the other end 16a of an adjoining section of coaxial cable 16 is attached to the connecting collet 28 of a coupling unit 15. It will, of course, be understood that the end of the cable section 16a attached to the connecting collet 28 includes the center conductor 22, the dielectric layer 23, the foil sheath 24, the cable braid 25 and the cable insulating layer 26. A connector housing 29 receives interiorly the cable and the metal sheath 24. The braid 25 is received over the housing 29 and the cable is crimped thereto by the crimping ferrule 27a. An appropriate connecting screw nut 29a, as is well understood in this art, is utilized to hold the end of cable section 16a to the collet 28.

Also, as will be more fully described subsequently in the specification, the coaxial cable 14 extending between the transmitter 12 and receiver 13 is completed by assembling the various sections 16 of coaxial cable together. As part of this process the coupling unit 15 is attached to one end of a section of cable 16 at the factory, for example, and the coupling unit 15 is attached to the base of an antenna assembly 21, also at the factory. Then, in the field where the intrusion detection system is to be installed, all the workman needs to do is to attach the antenna assembly including a coupling unit 15 to a fence post 20 and to screw the connecting nut 29 at cable end 16a to the connecting collet 28 of the coupling unit 15. When the desired number of cable section lengths 16 and coupling units (and antenna assemblies) are attached together and the transmitter and doppler detector connected the system is ready for functioning. When the coupling unit 15 is connected to the section of cable 16 at the factory, the center conductor 22 of the coaxial cable is inserted into a receiving slot in the center conductor end 31 of the coupling unit. When the other end 16a of a second section of cable 16 is connected to the connecting collet 28, the center conductor 22 of that section of cable is inserted into the corresponding slot in the center conductor end 32 of the coupling unit 15.

The antenna unit 21 will be more particularly described hereinafter, but the antenna 17 disposed interiorly thereof, in the preferred form of the invention, may comprise a dipole antenna consisting of two radiating elements 40 and 41 connected by means of a parallel plate transmission line 42, 43 to the coaxial cable 16 by means of the coupling unit 15. The antenna element 40 is coupled by means of transmission line element 42 to the center conductor of the coupling 15, as will be more particularly described, and the antenna element 41 is connected by means of transmission line element 43 to the outer, or ground, conductor of the coupling unit 15, also as will be more particularly described.

The method of coupling the antennas to the transmission line, or cable, is a key factor in producing an economically viable intrusion detection system as is more fully described in the application Ser. No. 6/172,944. In such a typical system of about 100 meters in length of cable there would be one transmitter, one receiver, one hundred meters of coaxial cable and 33 radiating elements. These components must be of low cost and easy to install. The shielded cable used preferably is the type commonly used in the cable television industry and is less than three precent of the cost of commercial versions of slotted leaky coaxial cable.

An integral cable splice connector and bidirectional coupler 15 as shown in the drawings allows the installer to connect ten feet sections of cable together and to snap the connector coupler in place between two leaf springs that lead to the driven elements of the dipole antenna.

Figure 7:
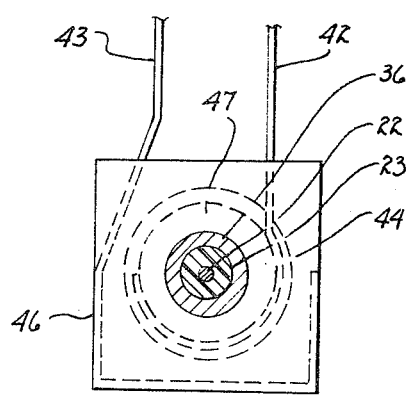
FIG. 7 is a sectional view of the coupling unit taken substantially in the direction of the arrows 7—7 of FIG. 6.
Figure 8:
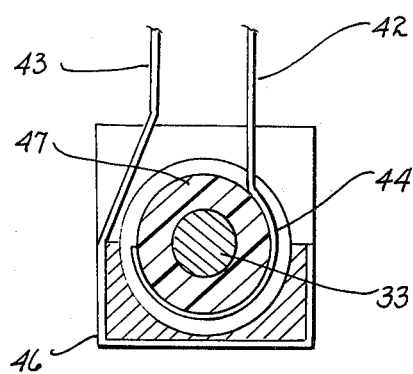
FIG. 8 is a sectional view taken substantially in the direction of the arrows 8—8 of FIG. 6.

The coupling unit 15 (referring to FIGS. 6, 7 and 8) may comprise a center conductor 30 having end portions 31 and 32 and a center portion 33, a surrounding dielectric member 34, an outer housing 35, the connecting collet 28 already referred to and a connecting extension 36, projecting from the opposite end of housing 35 to that of connecting collet 28. The connecting extension 36 has one end of the cable section 16 attached thereto as by the crimping ferrule 27, it being made certain that the foil sheath 24 is in good electrical contact with the interior of the connecting element 36 as by good crimping action.

Figure 6:
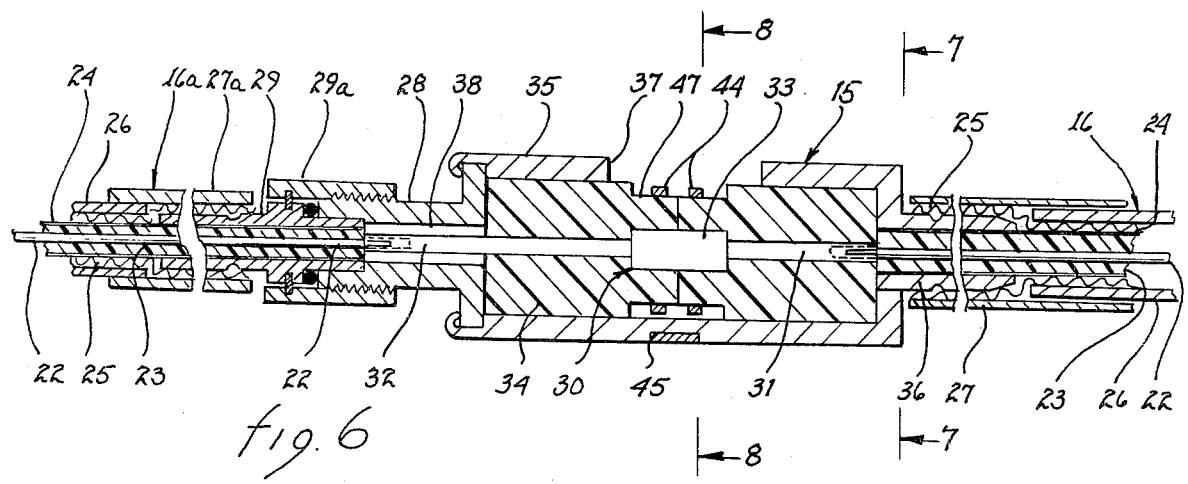
FIG. 6 is a sectional view of a coaxial cable connecting unit according to the invention.

As may be seen in FIG. 6 the dielectric member 34 is made of two parts for ease of assembly and the parts are held together by spin forming the edge of housing 35 onto the flange of collet 28.

In the construction of the coupling element 15 it is important that the impedances at each location within the coupling element be matched to the characteristic impedance of the cable 16, namely seventy-five ohms, in the particular case. Thus since the conducting end portion 31 of the central conductor 30, of necessity, is larger in diameter than the center conductor 22 of the cable 16, the diameter of that portion of the dielectric element 34 surrounding the conductor end 31 also is enlarged in diameter. This is to maintain the ratio between the outer diameter of the dielectric element 34 to the diameter of the conductor end 31 the same as the ratio of the outer diameter of the dielectric element 23 to the diameter of the center conductor 22.

The basic formula for determining the impedance in ohms of coaxial lines is $$Z = \frac{138}{\sqrt{e}} \log 10 \frac{b}{a}$$

where b is the outer diameter of the dielectric element, a is the diameter of the central conductor, and e is the dielectric constant of the dielectric material. Since the central conductor end portion 32 is of the same diameter as the central conductor end portion 31 it follows that that portion of the dielectric material 34 at the leftmost end of the coupler is of the same diameter as that at the rightmost end of the coupler.

The outer housing 35 must be opened as shown at 37 to enable the antenna element 40 (44) to be attached to the dielectric element 34. The impedance at this location of the coupler is, accordingly, changed. Specifically, because conducting material is removed to provide for the opening 37, the impedance of the coupler is increased. To balance this increase in the impedance of the coupling unit the center portion 33 of the central conductor 30 is enlarged in diameter as shown. Referring to the formula defining the basic impedance for coaxial cables, it will be evident that this decreases the impedance and thus compensates for the increase in impedance brought about by the opening 37.

Since the opposite end of the cable section 16, namely 16a, is attached by means of a connector housing 29 and coupling nut 29a to the collet 28 and it is intended that this assembly be made for example by a workman in the field, the dielectric 23 of the cable end 16a terminates near the beginning of the collet 28 while the center conductor 22 extends further in and is received within the slot in the end of conductor end portion 32. For this reason it is evident that there will be an air space 38 surrounding that portion of the center conductor 32 within the bore of collet 28. For impedance matching to occur at this location of the coupling unit, reference may again be had to the formula defining the impedance of coaxial cables. Thus, while the ratio of diameter of the bore (the air space 38) within the collet 28 to the diameter of the conductor 32 is now different from that of the remaining sections of the coupling unit, the dielectric in the air space 38 is that of air and not that of the dielectric material 34. It being observed that the dielectric constant e appears in the denominator of the constant of the basic impedance formula, the impedance is therefor reduced, while that of the different diameters would cause it to be increased. These two factors can be chosen to compensate for each other in such a manner that the impedance in the area of the air space 38 is the 75 ohms of the cable sections.

The opening 37, of course, causes radiation of energy to take place from the central conductor 30 and particularly the section 33. This energy is taken out by means of the arcuate portion 44 which is the end part of the transmission line member 42, the latter continuing as the radiating element 40 of the dipole antenna. The outer housing 35 of the coupling unit includes a groove 45 into which is disposed a bent portion 46 which becomes part of the transmission line element 43 that continues as the grounded portion 41 of the dipole antenna.

The arcuate portion 44 is of the same diameter as the portion 47 of the dielectric element 34 at that section. The diameter 47 is selected in accordance with known teachings to give the desired degree of coupling between the arcuate portion 44 and the connected antenna element 40 and the optimum coupling Q between the coupling unit and the radiating antenna. It will be clear that if the diameter of the portion 47 remains the same as the diameter of the remaining portion of the dielectric element 34 there will be one degree of coupling to the central conducting section 33 as compared with a condition, for example, that would exist if the arcuate element 44 were connected directly to the central conductor portion 33.

The optimum value of Q is related to the number of antennas (couplers) in the system by the expression $$Q = \sqrt{\frac{2}{2N+1}}$$

where N is the number of couplers. In this connection reference is made to the copending application Ser. No. 6/172,944.

Figure 9:
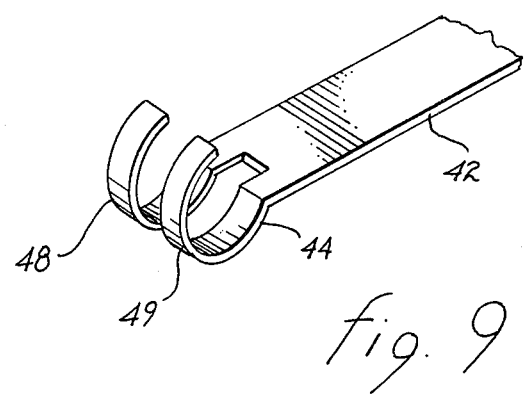
FIG. 9 is a detailed perspective view of one form of connector to the coaxial cable coupling unit.

Referring to FIG. 9, the arcuate portion 44 of the transmission line element 42 is divided into two parts 48 and 49 or is bifurcated. This is an artifice that may be used to decrease the degree of coupling between the arcuate element 44 and the central conducting portion 33.

It is important in utilizing the coupling units 15 that there be good contact to the center conductor 22 of the connecting cable and also to the metallic sheath 24 surrounding the dielectric element 23. For this reason the metallic foil sheath 24 is brought internally of the connecting extension 36 of the coupling housing and likewise is brought internally of the connector housing 29.

The antenna unit 21 comprises a housing 51 which may be of any suitable insulating material such as, for example, plastics, a cover 52 of synthetic material for example, the dipole antenna elements 40 and 41 supported upon upstanding supports 53 and 54 as by screws, for example, and a director element 55 disposed upon insulating supports 56. The spacing between the director element 55 and the elements 40 and 41 of the dipole antenna is essentially one-quarter wave length at the frequency being utilized.

Extending, respectively, from the dipole elements 40 and 41 are the parallel plate transmission line elements 42 and 43 which connect with the coupling unit 15 as already described.

The impedance of the dipole antenna 40, 41 is made essentially seventy-five ohms in order to match the impedances throughtout the system. The impedance of the antenna is matched to that of the coupling unit and as well to the cable sections 16 by the connecting transmission line 42, 43 which is constructed as a parallel plate line section whose impedance in ohms is determined basically by the formula $Z=377\ W/L$ where W is the spacing between the plates or elements 42 and 43 and L is the width of these plates. Thus the spacing between elements 42 and 43 and their width is chosen such that their ratio multiplied by 377 is equal to 75 ohms. Accordingly, the impedances are matched throughout the system.

Figure 3:
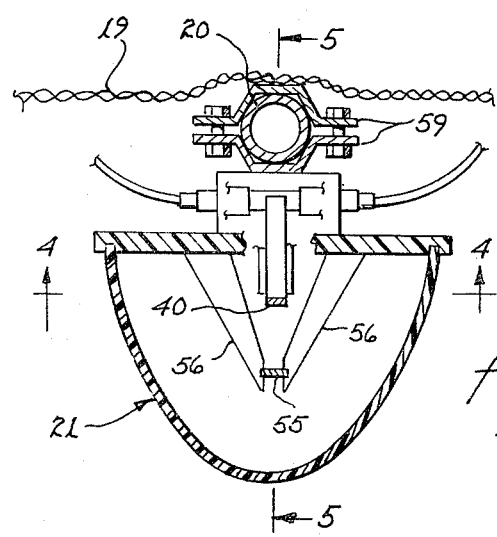
FIG. 3 is a cross-sectional view of a radiating element associated with the coupling unit according to the invention and taken substantially in the direction of arrows 3—3 of FIG. 2.
Figure 4:
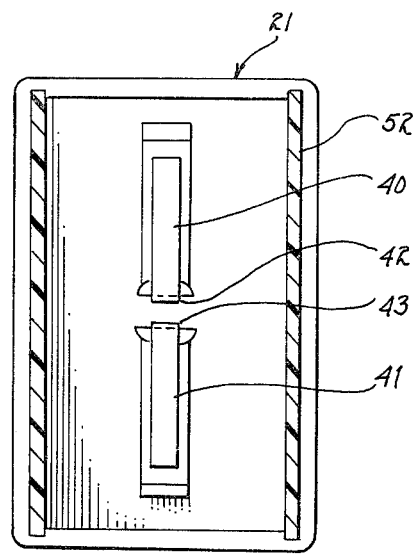
FIG. 4 is sectional view taken substantially in the direction of arrows 4—4 of FIG. 3.
Figure 5:
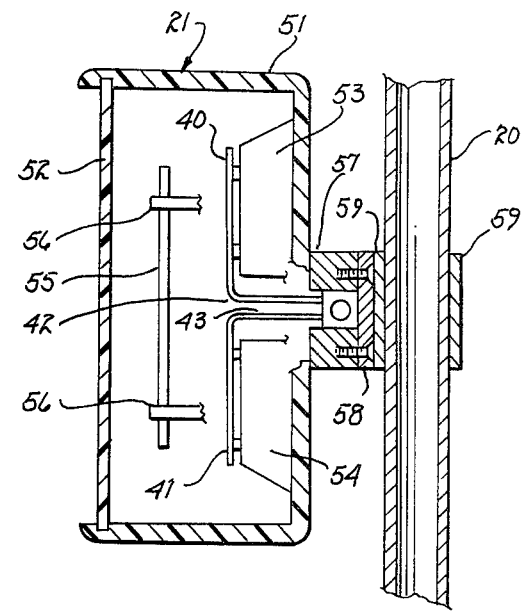
FIG. 5 is a sectional view taken substantially in the direction of arrows 5—5 of FIG. 3.

In a preferable form of the invention the antenna unit 21 is assembled to the coupling unit 15 at the place of manufacture as, for example, by a base 57 to which the coupling unit 15 may be held as by a plate 58 and screws, as seen best in FIG. 5. Then in the field where the unit is assembled for use, the assembled antenna unit is attached to a fence post 20, for example, by bolting together two halves of a clamp 59 as may be seen best in FIG. 3. Any other form of attachment, of course, may be used.

The parallel plate transmission line 42, 43 is ideal for use in the preferred form of the invention inasmuch as the normal ends of these two elements lend themselves to the formation of an attaching unit for coupling to the dielectric element 34 on the one hand and to the metallic housing 35 on the other. At the same time the other ends of the parallel plate antenna elements 42, 43 are bent into the dipole elements 40, 41.

The director element 55 is spaced in front of the antenna elements 40, 41 by a quarter wave length in order to direct the radiation pattern outwardly from the antenna in the desired pattern to provide a null at the fence post and the associated fence to prevent motions of the fence, etc. from causing variations in the radiation pattern. The mounting of the antenna elements 40, 41 to the fence post may also be such that the pole 20 acts as a reflector in order to assist in the formation of the desired directive pattern of the antenna.

Disposing the radome type cover 52 in front of the antenna 41, allows the antenna to maintain its directive pattern and prevents impedance changes during conditions of rain or other weather conditions. It also avoids any false alarming due to the presence of birds perched adjacent to the antenna.

Figure 10:
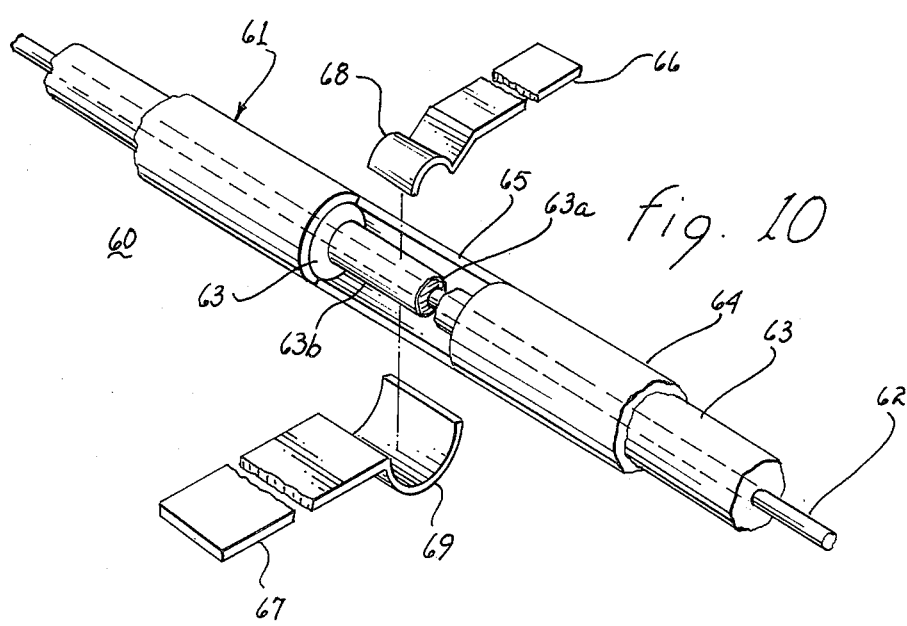
FIG. 10 is a perspective exploded view of a modified form of connecting or coupling unit according to the invention.

Referring to FIG. 10, there is shown a modified form of the invention in which the coupler 60 could be a separate unit or could in effect be an opening disposed in the coaxial cable itself. Thus, there is shown in this Figure a coaxial cable 61 comprising a central conductor 62, an insulating or dielectric layer 63 and an outer or metallic sheath 64.

The outer sheath 64 has an opening 65 cut thereinto to expose the dielectric layer 63 which may be reduced in cross section within the opening 65 and shown by the reference character 63a in accordance with the foregoing description in order to achieve the desired degree of coupling between the dipole antenna elements and the coaxial cable. Thus, the dipole antenna may comprise two parallel plate elements 66 and 67, the plate 66 having an arcuate portion 68 at one end for connection to the dielectric layer 63 and the antenna element 67 has an arcuate portion 69 for engagement around the outer metallic sheath or layer 64. For improved contact with the arcuate portion 68, the reduced dielectric layer 63a may be surrounded by a metallic film, or layer, 63b.

It will be recognized that an inexpensive form of intrusion detection system has been disclosed. While in FIG. 1, diagrammatically, one transmitter and one receiver have been shown together with a series of antennas 17, it will be understood that more than one of such systems may be utilized to define a total perimeter. Best results have been achieved when the length of coaxial cable between transmitter 12 and the receiver 13 is about 100 meters. Thus to define a larger perimeter, a series of combinations of transmitters, receivers and coaxial cables may, of course, be utilized. Systems according to the invention are utilizable within the frequency ranges authorized by the federal communications commission for intrusion equipment such frequencies include 915 mega-hertz 2.4 giga-hertz, 10.5 giga-hertz and 24.125 giga-hertz.

While preferred embodiments of the invention have been disclosed it will be understood that other forms may be devised within the spirit and scope of the disclosure. It is intended by the accompanying claims to cover all such forms.

We claim:

1. A coupling unit for joining two sections of coaxial cable and for coupling the coaxial cable to an antenna, the coaxial cable having a predetermined characteristic impedance and comprising an inner conductor, a surrounding layer of dielectric material and a conducting sheath surrounding the layer of dielectric material, said coupling unit comprising a central conductor having two end sections and a center section therebetween, each of said end sections being adapted to be connected to the center conductor of a coaxial cable, a cylindrical dielectric member surrounding the end sections and the center section of said central conductor, a metallic sleeve member surrounding said cylindrical dielectric member, the diameter of said two end sections and the diameter of said cylindrical dielectric member providing the same characteristic impedance as that of said coaxial cable, an opening in said metallic sleeve member adjacent the center section of said central conductor, a transmission line coupled to said central conductor at said opening an antenna coupled to said transmission line, the center section of said central conductor having an enlarged diameter for compensating for impedance mismatching due to said opening, and the portion of said cylindrical dielectric member adjacent said opening having a reduced diameter for effecting a desired coupling coefficient between said antenna and said central conductor.

2. The coupling unit according to claim 1 including a connecting member metallically joined to said sleeve and having an air filled central bore through which extends one of said end sections, the diameter of said air filled bore and the diameter of the end sections of the central conductor therethrough providing an impedance match to the characteristic impedance of said coaxial cable.

3. The coupling unit according to claim 2 wherein the ends of each of said end sections includes an opening for receiving the center conductor of a connected coaxial cable.

4. The coupling unit according to claim 3 wherein said ends of said end sections are split for spring engagement of the said coaxial cable center conductor.

5. The coupling unit according to claim 2 including a metallic arcuate member engaged around the reduced diameter portion of said cylindrical dielectric member, said metallic arcuate member terminating in a connecting lead to said antenna, and a groove in the exterior surface of said cylindrical sleeve member for receiving a second lead to said antenna.

6. The coupling unit according to claim 5 wherein said metallic arcuate member is bifurcated for effecting a desired coefficient of coupling from said coaxial cable to said antenna.

7. A coupling unit for joining two sections of coaxial cable and for coupling the coaxial cable to an antenna, the coaxial cable having a predetermined characteristic impedance and comprising an inner conductor, a surrounding layer of dielectric material and a conducting sheath surrounding the layer of dielectric material, said coupling unit comprising a central conductor, a surrounding dielectric member, a metallic sleeve member surrounding said cylindrical dielectric member, an opening in said sleeve member for enabling wave energy radiation from said coaxial cable, one antenna member extending through said opening and attached to said cylindrical dielectric member and a second antenna member attached to said metallic sleeve exteriorly thereof.

8. An antenna and coupling unit wherein the coupling unit is adapted to join two sections of coaxial cable and to couple the coaxial cable to the antenna, in a perimeter intrusion detection system the coaxial cable having a predetermined characteristic impedance and comprising an inner conductor, a surrounding layer of dielectric material and a conducting sheath surrounding the layer of dielectric material, said coupling unit comprising a central conductor having two end sections and a central section therebetween, said end sections being adapted to be connected to the center conductor of a coaxial cable, a cylindrical dielectric member surrounding the end sections and the center section of said central conductor, a metallic sleeve member surrounding said cylindrical dielectric member, the diameter of said two end sections and the diameter of said cylindrical dielectric member providing the same characteristic impedance as that of said coaxial cable, and an opening in said metallic sleeve member adjacent the center section of said central conductor for enabling coupling from said central conductor to said antenna, the center section of said central conductor having an enlarged diameter for compensating for impedance mismatching due to said opening, the portion of said cylindrical dielectric member adjacent said opening having a reduced diameter for effecting a desired coupling coefficient between said antenna and said central conductor, said antenna comprising a dipole antenna and the coupling between the antenna and the coupling unit comprises a parallel plate transmission line.

9. The antenna and coupling unit according to claim 8 wherein the perimeter includes a metallic wire fence attached to ground supported metal posts and one each of said antennas is attached to each one of said metal posts.

10. The antenna and coupling unit according to claim 9 wherein the dipole antenna is spaced from the metal post for the post to act as an energy reflector and the antenna includes an energy director spaced in front of the dipole elements.

* * * * *